United States Patent [19]

Unuma et al.

[11] 3,883,250

[45] May 13, 1975

[54] METHOD OF OPTICALLY MEASURING THE ABSORPTION OF LIGHT HAVING A SPECIFIC WAVELENGTH BY A SAMPLE, BY ADJUSTING THE OUTPUT OF A DETECTOR RESPONSIVE TO LIGHT HAVING WAVELENGTHS LONGER THAN THE SPECIFIC WAVELENGTH TO A ZERO LEVEL

[75] Inventors: Nobumitsu Unuma, Tokyo; Yasushi Nomura, Katsuta, both of Japan

[73] Assignee: Hitachi, Ltd., Japan

[22] Filed: July 5, 1973

[21] Appl. No.: 376,274

[30] Foreign Application Priority Data

July 7, 1972 Japan.............................. 47-67507

[52] U.S. Cl........... 356/184; 195/103.5 R; 350/315; 350/316; 356/189
[51] Int. Cl. ............................................. G01j 3/48
[58] Field of Search ............ 356/82, 184, 189, 201; 350/315, 316, 313; 195/103.5 R

[56]  References Cited
UNITED STATES PATENTS 3,194,962   7/1965   Carlon et al........................ 350/315

*Primary Examiner*—Vincent P. McGraw
*Attorney, Agent, or Firm*—Craig & Antonelli

[57] ABSTRACT

A method of optically measuring absorption of light having a specific wavelength of a sample by adjusting the output of a detector in response to light having wavelengths longer than the specific wavelength to a zero level comprising disposing a substantially monochromatic filter capable of transmitting at least light having the specific wavelength and light having longer wavelengths than the specific wavelength and a cut filter capable of substantially completely transmitting light having longer wavelengths than the specific wavelength but substantially completely intercepting light having the specific wavelength in a light beam emitted from a light source, passing the light beam emitted from the light source through the monochromatic filter and the cut filter to apply same to the detector showing a high sensitivity to light having wavelenghts longer than the specific wavelength, adjusting the output of the detector to the zero level, removing the cut filter from the light path between the light source and the detector, and inserting in the light path a sample having properties of absorbing light having the specific wavelength but substantially completely transmitting light having longer wavelengths than the specific wavelength for measuring optically the absorption of light of the specific wavelength by the sample.

7 Claims, 3 Drawing Figures

METHOD OF OPTICALLY MEASURING THE ABSORPTION OF LIGHT HAVING A SPECIFIC WAVELENGTH BY A SAMPLE, BY ADJUSTING THE OUTPUT OF A DETECTOR RESPONSIVE TO LIGHT HAVING WAVELENGTHS LONGER THAN THE SPECIFIC WAVELENGTH TO A ZERO LEVEL

BACKGROUND OF THE INVENTION

1. Field of the Invention

This invention relates to methods of measuring the absorption of light by samples and more particularly to a method of measuring optically the absorption of light by a sample having properties of absorbing light having a specific wavelength used for measurement but substantially completely transmitting light having longer wavelengths than the specific wavelength.

2. Description of the Prior Art

Small-sized and inexpensive photometers are increasingly demanded recently in the field of automatic analysis. One of such photometers complying with the above demand is the single beam type and employs an inexpensive filter. One of the most serious problems which arise from the use of this filter is the fact that the calibration curve is not sufficiently satisfactorily rectilinear due to the stray light produced by the tailing of the filter. For example, enzymes such as GOT, GPT and LDH are measured frequently by an automatic analyser, and the absorption of light of a wavelength 340 nm by $NADH_2$ (reduction type nicotinamide adenine nucleotide) is presently utilized for the measurement of these enzymes. A monochromatic filter used for selecting this specific wavelength has generally such properties that the rate of transmission of wavelengths longer than the specific wavelength above described is not negligible and stray light thus produced impairs the desired rectilinearity of the calibration curve. In order to solve these problems, the filtering properties of this filter must be reduced to obviate the undesirable tailing, but this results inevitably in an undesirable reduction of the quantity of light emerging therefrom. For example, in the case of measurement of the enzyme above described, the quantity of light having the wavelength 340 nm is considerably reduced resulting in substantial impossibility of measurement.

SUMMARY OF THE INVENTION

It is a primary object of the present invention to provide a method of measuring optically absorption of light by a sample wherein the absorption of light by the sample can be measured with high sensitivity and a calibration curve having a satisfactory rectilinearity can be very simply obtained.

In accordance with a preferred embodiment of the present invention, there is provided a method of measuring optically absorption of light by a sample comprising disposing a monochromatic filter (hereinafter the term "monochromatic" refers to a filter which is substantially monochromatic in that it has a maximum or peak transmission characteristic at a specific wavelength which characteristic drops of sharply on either side of the specific wavelength) capable of transmitting at least light having a specific wavelength and light having longer wavelengths than the specific wavelength and a cut filter capable of substantially completely transmitting light having longer wavelengths than the specific wavelength but substantially completely intercepting light having the specific wavelength in a light beam emitted from a light source, passing the light beam emitted from the light source through the monochromatic filter and the cut filter to apply same to a detector showing a high sensitivity to light having wavelengths longer than the specific wavelength, adjusting the output of said detector to the zero level, removing the cut filter from the light path between the light source and the detector, and inserting in the light path a sample having properties of absorbing light having the specific wavelength but substantially completely transmitting light having longer wavelengths than the specific wavelength for measuring optically absorption of the light of the specific wavelength by the sample.

Other objects, features and advantages of the present invention will be apparent from the following description taken in conjunction with the accompanying drawing.

DESCRIPTION OF THE PREFERRED EMBODIMENT

Figure 1:
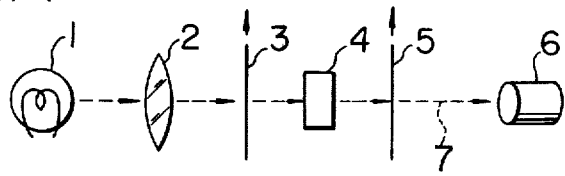
FIG. 1 is a diagrammatic view showing an optical system preferably used for the practice of a method according to the present invention.

Referring to FIG. 1, a light beam emitted from a light source 1 passes through a lens 2, a monochromatic filter 3, a sample 4, and a cut filter 5 along a light path 7 to be detected by a detector 6. The monochromatic filter 3 acts to convert the light beam passed through the lens 2 into monochromatic light and is capable of transmitting at least light having a specific wavelength of, for example, 340 nm used for measurement and light having longer wavelengths than this specific wavelength. The sample 4 has such properties that it absorbs light having this specific wavelength 340 nm and transmits substantially completely light having longer wavelengths than this specific wavelength. This sample 4 may be $NADH_2$ (reduction type nicotinamide adenine nucleotide) which absorbs this specific wavelength. The cut filter 5 transmits substantially completely light having wavelengths longer than this specific wavelength and intercepts substantially completely light having wavelengths shorter than the specific wavelength. The detector 6 may be a silicon photodiode which shows a high sensitivity to light having longer wavelengths than the specific wavelength.

Figure 2:
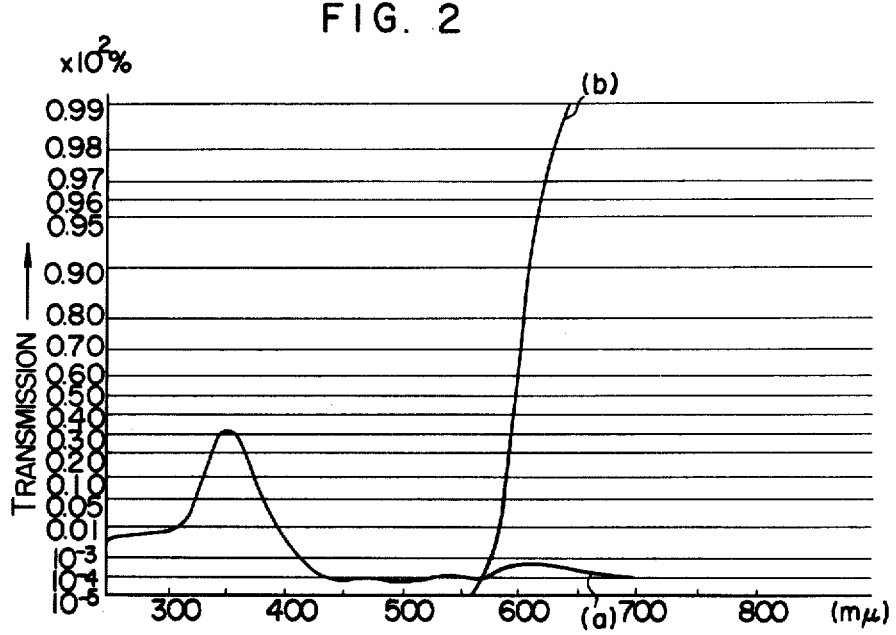
FIG. 2 is a graph showing the filtering properties of filters employed in the optical system shown in FIG. 1.

The sample 4 such as $NADH_2$ is not initially disposed in the light path 7 and the light beam emitted from the light source 1 is passed through the lens 2 and the monochromatic filter 3 having filtering properties as shown by the curve a in FIG. 2 so as to obtain monochromatic light having a wavelength 340 nm. As shown by the curve a in FIG. 2, this monochromatic filter 3 shows a maximum rate of transmission in the vicinity of a wavelength 340 nm and a slight rate of transmission in a longer wavelength range in the vicinity of a wavelength 600 nm, and this latter transmission produces a noise during measurement. Therefore, the output of the detector 6 obtained in the absence of the sample 4 must be adjusted to the zero level prior to the actual measurement on the sample 4 taking into consideration the transmission of the longer wavelengths by the filter 3. The cut filter 5 is provided for this purpose, and has filtering properties as shown by the curve b in FIG. 2. It will be seen from the curve b that the cut filter 5 cuts sharply light having wavelengths shorter than 600 nm and transmits more than 99% of light having wavelengths longer than 600 nm.

Therefore, the monochromatic light of the wavelength 340 nm passed through the monochromatic filter 3 having the filtering properties shown by the curve a in FIG. 2 is sharply cut by the cut filter 5 having the filtering properties shown by the curve b in FIG. 2, and the light having the wavelengths in the vicinity of 600 nm passed through the cut filter 5 to be received by the detector 6. Thus, the adverse effect of the light having the wavelengths in the vicinity of 600 nm and producing an undesirable noise can be eliminated by electrically setting the detector output at the zero level prior to the measurement on the sample 4.

After the above preliminary step, the cut filter 5 is removed from the light path 7 between the light source 1 and the detector 6, and in lieu of this filter 5, the sample 4 of $NADH_2$ is disposed in the light path 7 between the monochromatic filter 3 and the detector 6 for measuring the absorption of the light of the wavelength 340 nm by the sample 4. Although the monochromatic filter 3 has the filtering properties shown by the curve a in FIG. 2, the sample 4 of $NADH_2$ has such properties that it does not absorb any wavelengths except the specific wavelength 340 nm and transmits substantially completely wavelengths other than the wavelength 340 nm. Thus, the intensity of light having wavelengths longer than the specific wavelength 340 nm and directed to the detector 6 when the sample 4 is disposed in the illustrated position after removal of the cut filter 5 from the light path 7 is substantially equal to that directed to the detector 6 during the adjustment of the detector output to the zero level. Due to the fact that the output of the detector 6 has been set at the zero level during the above adjustment step, true absorption of the light having the wavelength 340 nm by the sample 4 can be measured without being adversely affected by the light having longer wavelengths when the sample 4 is disposed in the illustrated position after removal of the cut filter 5 from the light path 7.

Further, a silicon photodiode which shows a high sensitivity to wavelengths longer than the specific wavelength 340 nm is used as the detector 6, as described previously. Thus, even when both the monochromatic filter 3 and the sample 4 may absorb wavelengths shorter than the specific wavelength 340 nm, absorption of such wavelengths does not produce any appreciable noise and can be ignored. Furthermore, the sample can be measured with high sensitivity due to the fact that it is utterly unnecessary to reduce the quantity of light entering the monochromatic filter 3.

Figure 3:
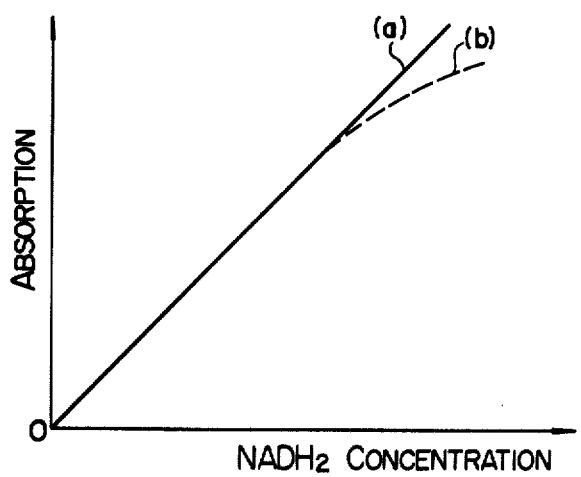
FIG. 3 is a graph showing the rectilinearity of the calibration curve obtained by an embodiment of the present invention for comparing same with a similar result obtained by a prior art method.

FIG. 3 shows the rate of light absorption by the sample $NADH_2$ relative to the concentration thereof. The line a in FIG. 3 represents the calibration curve according to the present invention in which the cut filter is employed for adjusting the detector output to the zero level, and the line b represents the calibration curve when such cut filter is not employed. It will be apparent from the line a that the use of the cut filter is advantageous in that the calibration curve is sufficiently rectilinear even in the high concentration range of the sample.

It will be understood from the foregoing detailed description that the method according to the present invention is advantageous in that a satisfactorily rectilinear calibration curve can be very easily obtained and optical absorption of a sample can be measured with high sensitivity.

We claim:

1. A method of optically measuring the absorption of light having a specific wavelength by a sample comprising the steps of:
   a. directing a beam of light along a prescribed path to light detecting means;
   b. inserting into said beam of light a substantially monochromatic filter, said filter effectively transmitting light at substantially said specific wavelength;
   c. inserting into said beam of light, optically in series with said monochromatic filter, a selective filter which effectively passes light at wavelengths other than at said specific wavelength, and which effectively blocks light at said specific wavelength;
   d. adjusting the output of said light detecting means to a zero level in response to the light passing through both said substantially monochromatic filter and said selective filter;
   e. removing said selective filter from said beam of light;
   f. inserting into said beam of light, optically in series with said monochromatic filter, a sample which effectively absorbs light having said specific wavelength but effectively transmits light containing wavelengths other than said specific wavelength; and
   g. measuring the absorption of light of said specific wavelength by said sample by measuring the output of said detecting means, in response to the light passing through both said substantially monochromatic filter and said sample.

2. A method according to claim 1, wherein said substantially monochromatic filter is also capable of transmitting light at wavelengths longer than said specific wavelength.

3. A method according to claim 1, wherein said selective filter is a low-pass filter which effectively passes light containing wavelengths longer than said specific wavelength and which effectively blocks light having containing wavelengths below said specific wavelength.

4. A method according to claim 1, wherein said detecting means is a detector having a high sensitivity to light containing wavelengths longer than said specific wavelength.

5. A method according to claim 1, wherein said sample has the property of effectively absorbing light having said specific wavelength and effectively completely transmitting light containing wavelengths longer than said specific wavelength.

6. A method of optically measuring the absorption of light having a specific wavelength by a sample comprising the steps of:
   a. directing a beam of light along a prescribed path to light detecting means having a high sensitivity to light at wavelengths longer than said specific wavelength;
   b. inserting into said beam of light a substantially monochromatic filter which effectively transmits light at substantially said specific wavelength and which also transmits light to a relatively lesser degree at wavelengths longer than said specific wavelength;

c. inserting into said beam of light, optically in series with said monochromatic filter, a low pass filter which effectively passes light having wavelengths longer than said specific wavelength and which effectively blocks light having wavelengths shorter than said specific wavelength;

d. adjusting the output of said light detecting means to a zero level in response to the light passing through both said substantially monochromatic filter and said low-pass filter;

e. removing said low-pass filter from said beam of light;

f. inserting into said beam of light, optically in series with said monochrmatic filter, a sample which effectively absorbs light having said specific wavelength but effectively transmits light containing wavelengths longer than said specific wavelengths; and g. measuring the absorption of light of said specific wavelength by said sample by measuring the output of said detecting means in response to the light passing through both said substantially monochromatic filter and said sample.

7. A method of optically measuring the absorption of light having a specific wavelength of 340 nm by a sample of reduction type nicotinamide adenine nucleotide comprising the steps of:

a. directing a beam of light along a prescribed path to a silicon photo diode detector having a high sensitivity to light containing wavelengths longer than 340 nm;

b. inserting into said beam of light a substantially monochromatic filter having a maximum degree of transmission of light at substantially 340 nm and a lesser degree of transmission of light over a range of wavelengths longer than 600 nm;

c. inserting into said beam of light, optically in series with said monochromatic filter, a low-pass filter which transmits more than 99 percent of light containing wavelengths longer than 600 mm and effectively blocks light containing wavelengths shorter than 600 nm;

d. adjusting the output of said silicon photo diode detector to a zero level in response to light passing through both said substantially monochromatic filter and said low-pass filter;

e. removing said low-pass filter from said beam of light;

f. inserting said sample into said beam of light optically in series with said monochromatic filter, and g. measuring the output of said silicon photo diode detector in response to the light passing through both said substantially monochromatic filter and said sample.

* * * * *